E. H. VINCENT.
TILTABLE STEERING WHEEL.
APPLICATION FILED NOV. 25, 1918.

1,315,261.

Patented Sept. 9, 1919.
4 SHEETS—SHEET 1.

Inventor
Edward H. Vincent,
By
Attorneys

E. H. VINCENT.
TILTABLE STEERING WHEEL.
APPLICATION FILED NOV. 25, 1918.
1,315,261.
Patented Sept. 9, 1919.
4 SHEETS—SHEET 2.
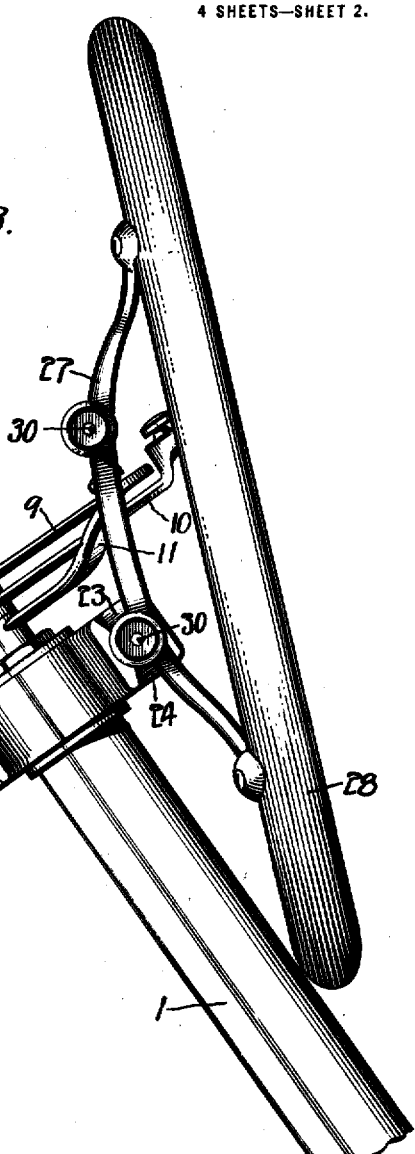
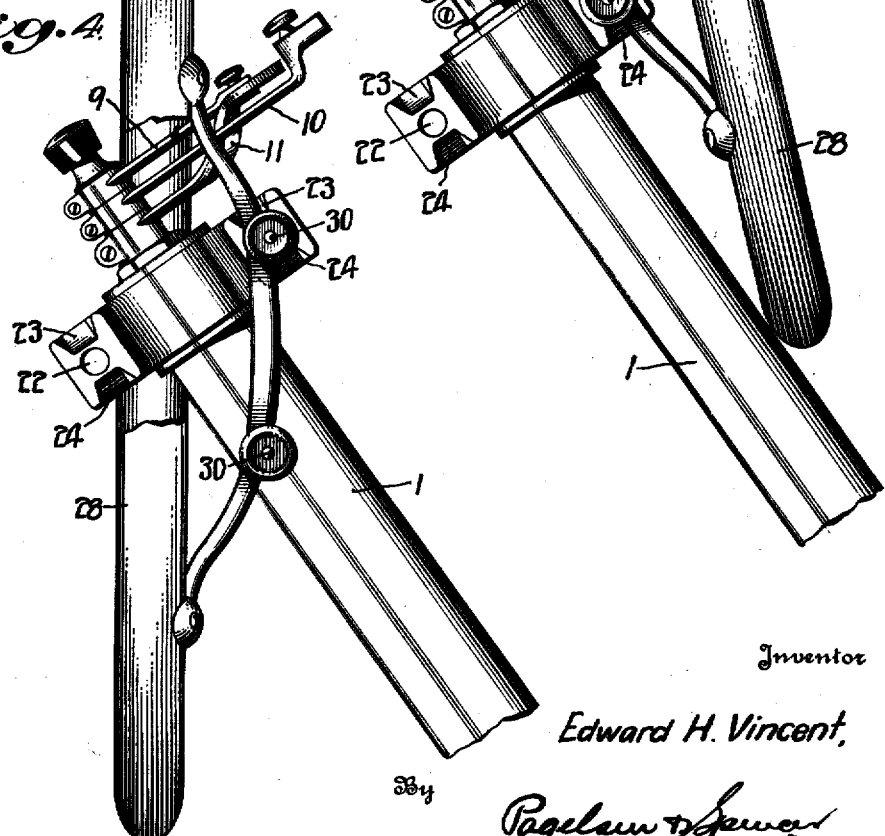
Inventor
Edward H. Vincent,

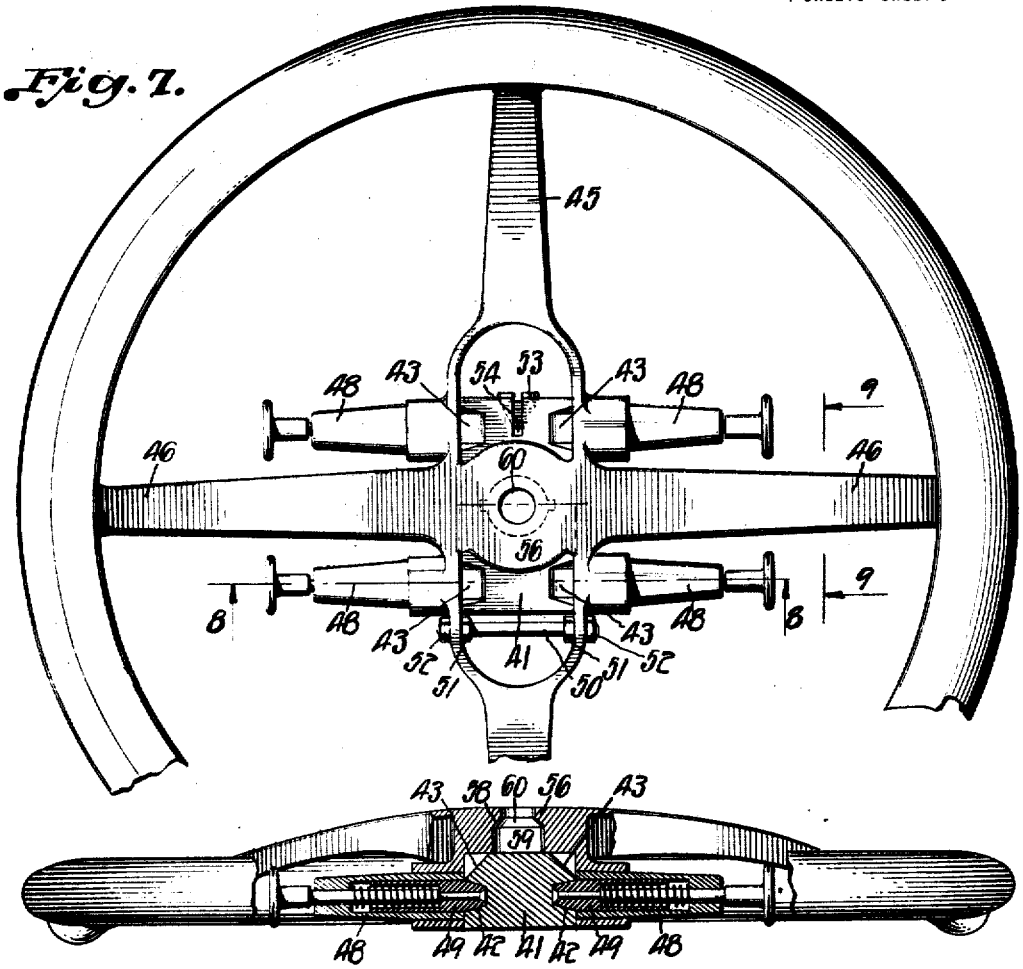

E. H. VINCENT.
TILTABLE STEERING WHEEL.
APPLICATION FILED NOV. 25, 1918.
1,315,261.
Patented Sept. 9, 1919.
4 SHEETS—SHEET 4.
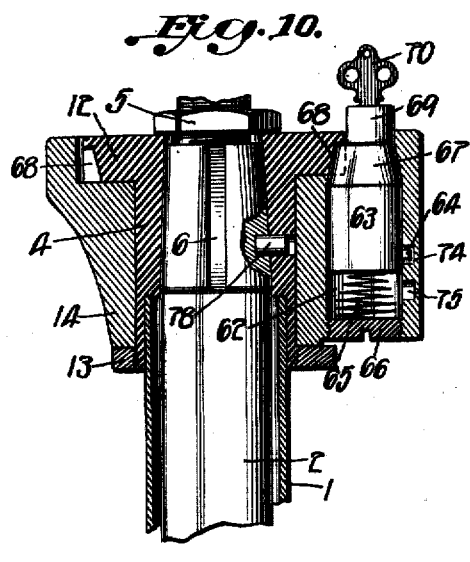
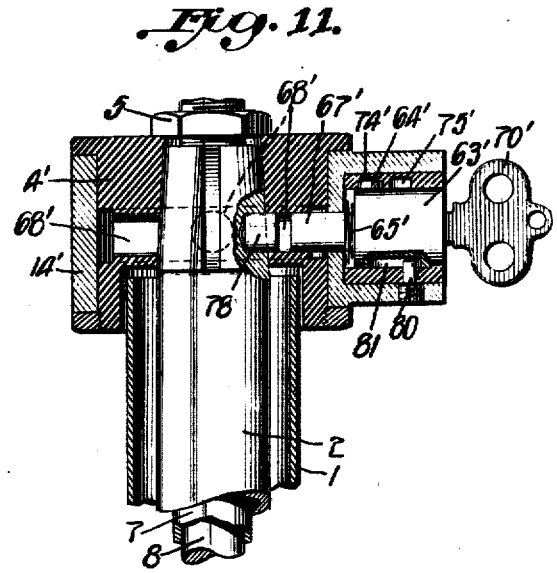
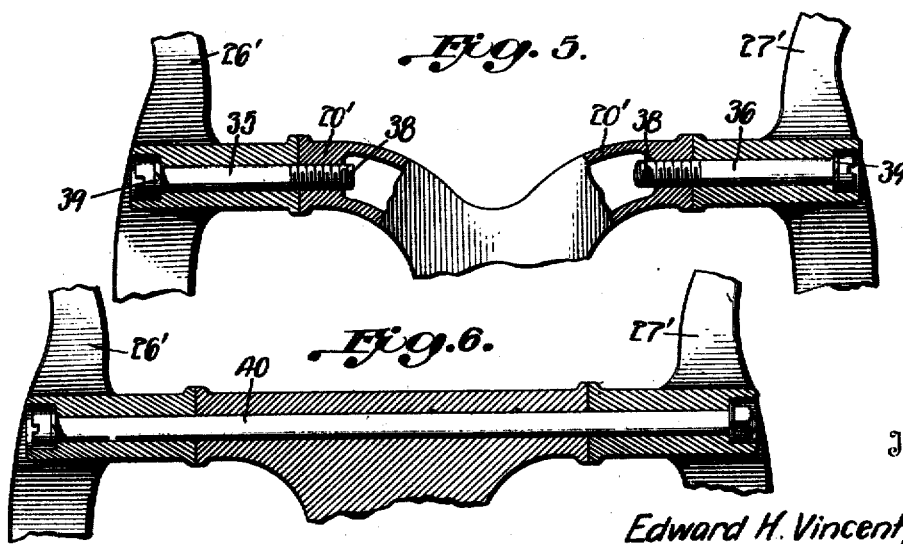
Inventor
Edward H. Vincent,

UNITED STATES PATENT OFFICE.

EDWARD H. VINCENT, OF DETROIT, MICHIGAN.

TILTABLE STEERING-WHEEL.

1,315,261.　　　　Specification of Letters Patent.　　Patented Sept. 9, 1919.

Application filed November 25, 1918.　Serial No. 263,979.

*To all whom it may concern:*

Be it known that I, EDWARD H. VINCENT, a citizen of the United States, and residing at Detroit, in the county of Wayne and State of Michigan, have invented a new and improved Tiltable Steering-Wheel, of which the following is a specification.

The present invention has reference to a tiltable steering wheel for motor vehicles. One of its objects is to provide a wheel which may be tilted either up or down about an axis offset from the post. The invention also provides a tiltable wheel which may be readily removed from the post.

Another feature of the invention resides in the provision of a head having two pairs of arms upon which the wheel rim is mounted by means of segment plates that normally extend substantially longitudinally of the vehicle, thus forming an unusually attractive wheel and at the same time affording clearance for such vehicle control mechanism as may be positioned on the post.

Again, the invention resides in certain locking means whereby the wheel may be locked free from or fixed to the post head at will.

The invention further consists in other details of construction shown, described and claimed.

Figure 1:
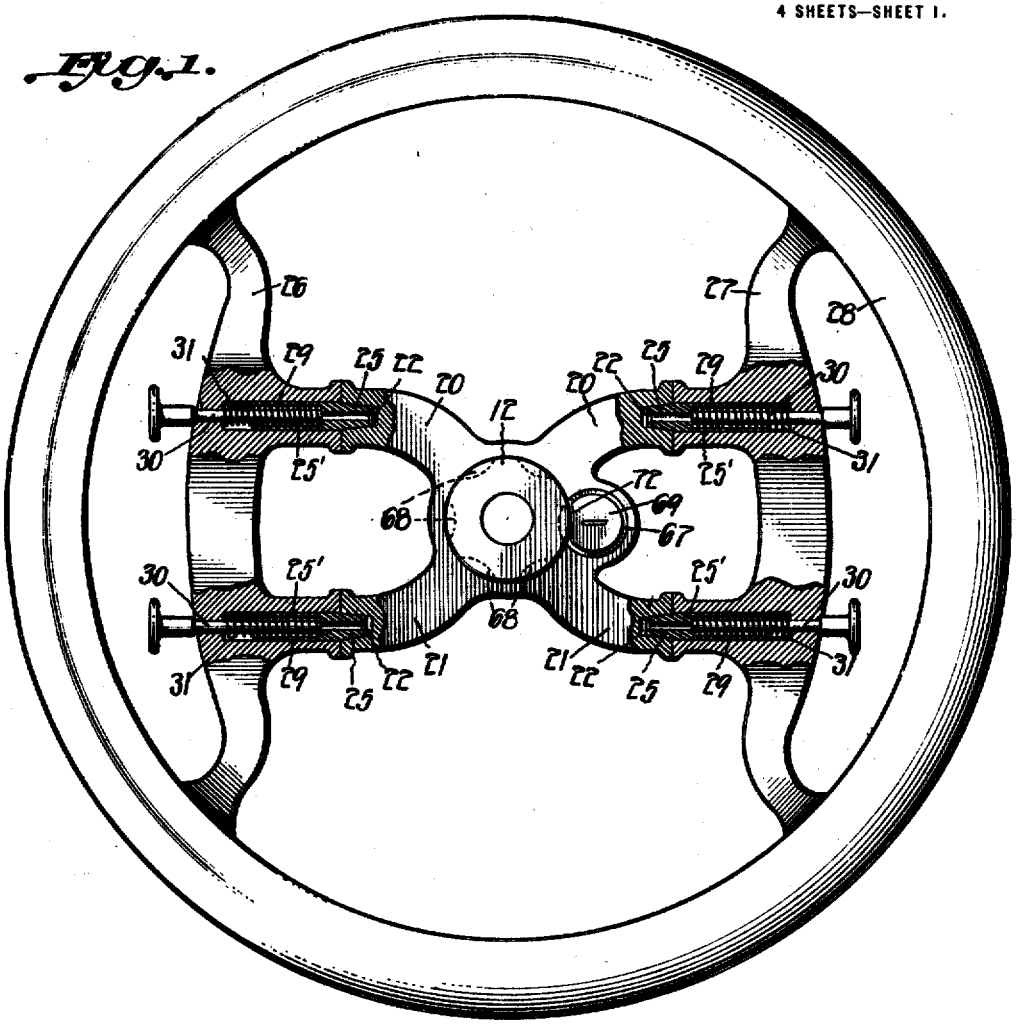
Figure 2:
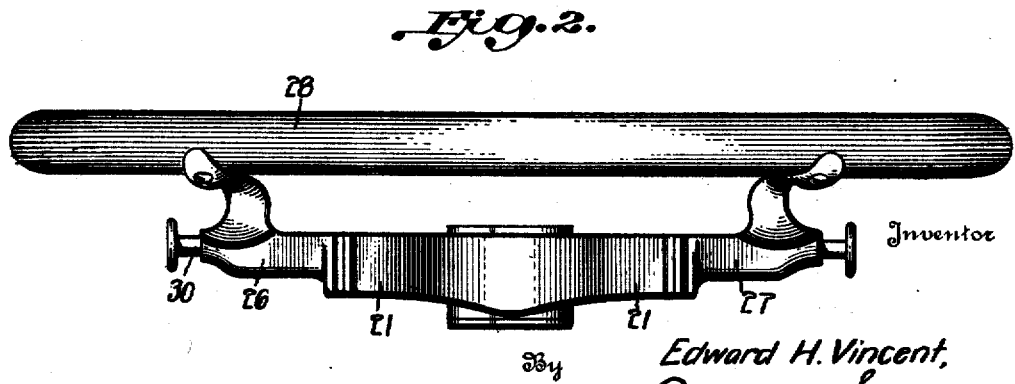

In the drawings, Figure 1 is a plan view, parts being broken away, showing one embodiment of the invention, the wheel being detached from the post. Fig. 2 is a side view corresponding thereto. Figs. 3 and 4 are side views, the first showing the wheel raised and thrown forwardly and the second showing it dropped. Figs. 5 and 6 are fragmentary plan views, parts being broken away, showing modifications in the pivot structure. Fig. 7 is a fragmentary plan view showing a further modification. Figs. 8 and 9 are sections on the lines 8—8 and 9—9 of Fig. 7. Fig. 10 is a longitudinal section showing the locking means which appears in Fig. 1. Fig. 11 is a similar section illustrating a modification.

The usual steering post appears at 1, and inclosed therein is the steering shaft or rod 2 (Figs. 10 and 11) upon the conical upper end of which a bushing 4 is adapted to be secured by the nut 5 and the key 6. The steering shaft, when made hollow as shown, admits the passage of the usual concentric spark and throttle control elements 7 and 8 the levers and associated arc of which are designated 9—10—11 (Figs. 3 and 4). The bushing has an annular flange 12 at its upper end and is threaded at its lower end to receive a nut 13 whereby a head 14 is secured thereon. As shown, the head is free to turn on the bushing when certain locking means, hereinafter described, is in unlocked position, but in those cases in which the locking feature is not deemed necessary, the bushing and head may be permanently coupled together or even made integral, as will be obvious.

In the embodiment of the invention shown in Figs. 1 to 4, inclusive, the head comprises two pairs of arms 20, 21, symmetrically disposed with reference to a transverse plane through the steering post, and the end of each of these arms is socketed at 22 to receive a latch and is provided adjacent the socket with inclined striker surfaces 23 and 24 adapted to be engaged by the latch as it approaches the socket. The latches 25 are carried in the sockets 25' in the chord bars or plates 26—27 of the rim 28, and each includes a hollow barrel 29, a pull rod 30, and an interposed spring 31 whereby the latch is normally thrust inwardly. Various other latch constructions may, of course, be substituted therefor.

It is evident that by withdrawing the rear latches from the sockets 22, the wheel may be either dropped downwardly (Fig. 4) or thrown upwardly and forwardly (Fig. 3). Evidently, also, both sets of latches may be withdrawn, whereupon the rim may be removed from the head and taken with the driver rather than left on the car, thus rendering it more difficult for the car to be stolen.

In Fig. 5, the front pair of latches is replaced by alined screws 35—36 carried by the bars 26' and 27' (that correspond respectively to the bars 26 and 27) and threaded into the arms 20'. It is preferred to pierce the ends of the screws to receive cotter pins 38 and to provide lock washers 39 to maintain adjustment. By a slight further modification, Fig. 6, the two screws 35—36 may be replaced by a single pivot bolt 40.

Certain features of the invention may also be applied to steering wheels of the type in which the spark and throttle control levers are located below the plane of the rim—see Figs. 7, 8 and 9. In this case the head 41 may be made comparatively long and narrow and is provided with two pairs of alined tapering sockets 42 having adjacent thereto inclined striker surfaces 43. These parts correspond, respectively, to the sockets 22 and the surfaces 23. The spider may be provided with the alined pairs of spokes 45 and 46, the former being arranged to extend longitudinally of the vehicle when in normal driving position. The spider conforms to the head 41 and carries two pairs of alined pivot casings 48 wherein latches 49 of the same construction as those heretofore described are carried in position to be received in the sockets 42. Proper relative adjustment between the walls of the spider and the head may be obtained in various ways, for example, at one end by means of the bolt 50 which is provided with the inner and outer nuts 51—52, and at the other end by means of the tapering threaded screw or wedge 53 and the correspondingly threaded slot construction 54, it being understood that the walls of the head are spread apart from one another as the screw is forced inwardly. Either one of these adjusting mechanisms may obviously be used both at the front and rear sides of the heads.

As best shown in Fig. 8, it is preferred to provide the spider, at least immediately above the steering post, with a cross-wall 56 having therein a cylindrical depression that terminates in a conical seat 58 concentric with the axes of the post. By providing the head with a corresponding upstanding cylinder projection 59 terminating in a conical end 60, the wheel may be automatically centered in reference to the head and a much stiffer construction is insured, since the latches tend to draw the spider down firmly to the end 60.

*Lock features.*—It will be observed, Figs. 1 and 10, that the rotatable head 14 has a cylindrical socket 62 in which a lock casing or barrel 63 is slidable. The barrel contains any preferred lock mechanism (not shown) whereby the transversely projecting pin 64 may be projected or withdrawn into the barrel at will. A spiral spring 65, positioned between the removable screw 66 and the bottom of the barrel, tends to force the latter upwardly so that the tapered conical upper contact portion 67 with which it is preferably provided normally bears in one of the segmental conical seats 68 formed in the flange 12. By continuing the barrel upwardly as a cylindrical neck 69 into which the key 70 may be inserted, and by machining away a portion of the side of said neck as shown at 72, Fig. 1, it is evident that the barrel is prevented from turning about its own axis when the pin 64 is withdrawn. This pin is adapted to be received in either of two sockets 74 or 75. When in the position shown, the wheel is locked firmly to the head, the spring 65 maintaining the portion 67 in close engagement with the corresponding seat 68; when the barrel is in its innermost position, that is, when the pin 64 is received in the opening 75, the upper face of the tapered portion 67 of the barrel is below the lower face of the flange 12 and the wheel is free to spin on the head. By thus utilizing the lock barrel itself as a locking member, a much greater area of metal is opposed to shearing than would be the case were the barrel stationary and provided with a projectable plunger or detent.

In order to prevent the head from being withdrawn from the shaft 2, it is preferred to permanently connect them by a transverse pin 78.

In the modification, Fig. 11, the seats 68' are cylindrical and extend into the head 4' radially about the axis of the shaft 2, and the neck 67', which corresponds to the neck 67, is cylindrical. The key 70', pin 64', sockets 74' and 75', and the spring 65' correspond, respectively, to the parts 70, 64, 74, 75 and 65 heretofore described. The barrel 63' of the lock is in this instance prevented from angular movement, when the pin 64' is withdrawn, by the threaded pin 80 which projects into the slot 81 formed in said barrel. A pin 78 which is received in one of the seats or sockets 68' corresponds to the pin 78'.

It will be observed that the pin 67', when withdrawn, rides in a circumferential groove in the bushing 4' and projects somewhat into said groove; therefore it is not possible for a thief to disassemble the head 14' from the bushing by unscrewing the nut 13. This, and the fact that the pin 78' is not accessible except after the head 14' is removed, renders the device substantially thief proof.

In both embodiments the pins 64—64' are prevented from being accidentally lodged in neutral position with reference to the sockets 74—75, 74'—75' by the action of the springs 65—65'.

When the wheel is unlocked from the head, the former may be turned angularly about the post to such a position as gives maximum clearance when it is thereafter tilted; consequently it is not necessary to set the vehicle wheels in any particular position with reference to the body in order to allow the driver to readily enter or leave the seat.

It is evident that the details of construction are subject to considerable variation, and I do not, therefore, wish to be limited except as indicated by the subjoined claims.

I claim:

1. In combination with a steering shaft of a motor vehicle and a head fixed thereto, a wheel structure mounted to tilt in either direction in respect to said head and about an axis at right angles to that of the shaft and offset considerably therefrom, and latch means connecting the wheel structure and the head at a point on the opposite side of the axis of the shaft from the axis about which the wheel structure tilts.

2. In combination, a head adapted to be secured to a steering shaft and comprising two pairs of arms, the arms of each pair being disposed oppositely to each other and being spaced considerably from the arms of the other pair, a rim structure, pivot means for connecting the rim structure to one pair of the arms, and means for latching the rim structure to the outer end portions of the other pair of arms.

3. In combination, a substantially H-shaped head adapted to be secured to a steering shaft, a rim structure pivoted to swing about a line joining the outer ends of one of the side bars of the H, and latch means for securing the rim structure to the outer ends of the other side bar of the H.

4. In combination, a head adapted to be secured to a steering shaft, a rim structure, said head and rim structure including four releasable combined pivots and latches arranged in two alined pairs, whereby the rim structure may be tilted about either pair of pivots at will or may be held in proper steering relation to the shaft.

5. In combination, a rim structure including a pair of separate chord bars, a head adapted to be attached to a shaft, means for joining the chord bars to the head to swing about a line at right angles to the axis of the shaft and offset considerably therefrom, and latch means for connecting the chord bars to the head at points offset from the axis of the shaft, whereby the rim structure is supported on the head at four widely spaced points.

6. In combination, a head for a steering shaft, a rim structure mounted thereon and independently tiltable about either of two fixed parallel lines transversely of the axis of said shaft.

7. In combination, a head for a steering shaft, a rim structure, said head and rim structure including and connected by two pairs of releasable latch pivots, the members of each pair being alined with one another and both pairs being offset from the axis of the shaft, and means for relatively adjusting the head and rim structure in the region of each of said pairs of latch pivots.

8. In combination, a steering shaft, a bushing keyed thereon, a head rotatable on the bushing, a transverse pin connecting the bushing and the shaft, said pin being concealed by the head.

9. In combination, a head adapted to be secured to a steering shaft, a rim structure, said head and rim structure including four releasable combined pivots and latches arranged in two alined pairs, whereby the rim structure may be tilted about either pair of combined pivots and latches at will or may be removed bodily from the head when said combined pivots and latches are released.

10. A steering wheel comprising a rim, chord bars for the rim, a head adapted to be attached to a steering shaft, retractible pivots carried by the chord bars and engaging the head, and releasable latch means spaced from the axis of said pivots, whereby said rim and chord bars may tilt about the head and whereby the rim and chord bars may be freely removed from the head when the latch means is released and the pivots are retracted and without disassembling either chord bar from the rim.

EDWARD H. VINCENT.

Copies of this patent may be obtained for five cents each, by addressing the "Commissioner of Patents, Washington, D. C."